United States Patent
Unrau (10) Patent No.: US 11,854,000 B1
(45) Date of Patent: Dec. 26, 2023

(54) SYSTEMS AND METHODS FOR OPTIMIZED SETTLEMENT OF SPONSORED ELECTRONIC TRANSACTIONS

(71) Applicant: Worldpay, LLC, Symmes Township, OH (US)

(72) Inventor: Jackson Andrew Unrau, Littleton, CO (US)

(73) Assignee: Worldpay, LLC, Symmes Township, OH (US)

( * ) Notice: Subject to any disclaimer, the term of this patent is extended or adjusted under 35 U.S.C. 154(b) by 6 days.

(21) Appl. No.: 16/826,590

(22) Filed: Mar. 23, 2020

Related U.S. Application Data (62) Division of application No. 16/235,476, filed on Dec. 28, 2018.

(51) Int. Cl.
| | | |
|---|---|---|
| *G06Q 20/34* | (2012.01) | |
| *G06Q 20/40* | (2012.01) | |
| *G06Q 50/30* | (2012.01) | |
| *G06Q 50/06* | (2012.01) | |

(52) U.S. Cl.
CPC ....... *G06Q 20/3433* (2013.01); *G06Q 20/405* (2013.01); *G06Q 50/06* (2013.01); *G06Q 50/30* (2013.01)

(58) Field of Classification Search
CPC ...... G06Q 40/00; G06Q 20/26; G06Q 40/025; G06Q 30/351; G06Q 20/342
USPC .......................................................... 705/35
See application file for complete search history.

(56) References Cited

U.S. PATENT DOCUMENTS

| | | | |
|---|---|---|---|
| 2004/0083183 A1 | 4/2004 | Hardesty et al. | |
| 2007/0100745 A1 | 5/2007 | Keiser et al. | |
| 2007/0106602 A1* | 5/2007 | Wolters .................. | G06Q 20/02 705/39 |
| 2007/0219900 A1 | 9/2007 | Macguire | |
| 2010/0274680 A1* | 10/2010 | Carlson .................. | G06Q 30/08 705/26.1 |
| 2011/0099055 A1* | 4/2011 | Khalil ..................... | G07F 13/02 705/14.1 |
| 2014/0180925 A1* | 6/2014 | Fordyce, III ........... | G06Q 20/22 705/44 |
| 2015/0120474 A1* | 4/2015 | Webb ..................... | B67D 7/348 705/18 |
| 2016/0350745 A1* | 12/2016 | Wilkes .................. | G06Q 20/342 |
| 2019/0228479 A1* | 7/2019 | Williams .............. | G07F 13/025 |

* cited by examiner

*Primary Examiner* — Kirsten S Apple
(74) *Attorney, Agent, or Firm* — Bookoff McAndrews, PLLC (57) ABSTRACT

A computer-implemented method for prepaid card funding for sponsored purchases includes receiving a payment request for funding a sponsored purchase using a payment vehicle, deducting funds from a financial account associated with the payment vehicle, such that the financial account has a negative balance, and loading additional funds into the financial account associated with the payment vehicle, such that the financial account has a zero balance.

9 Claims, 6 Drawing Sheets

| ACCOUNTID | TOKEN | RECORDCOUNT | FILEID |
|---|---|---|---|
| 1234 | 00000000-0000-0000-0000-000000000000 | 4 | 56782 |
| CARDNUMBERBIN | CARDNUMBERLAST4 | AMOUNT | AUTHID | INTEGRATIONID |
| 548748 | 1151 | -67.89 | NFWW9I | 1234-5678 |
| 548748 | 1151 | -89.78 | Y3RGBQ | 1478-2589 |
| 548749 | 1151 | -23.45 | ABC123 | 4567-5623 |
| 548749 | 1151 |  | ABC123 | 9632-8745 |

500 — 542 ACCOUNTID, 544, 546 CARDNUMBERBIN, 548, 505 TOKEN, 510 RECORDCOUNT, 515 FILEID, 520, 525, 530 AMOUNT, 535 AUTHID, 540 INTEGRATIONID

FIG. 5B

| ACCOUNTID | COUNT | FILEID |
|---|---|---|
| 1 | 4 | 56782 |

| CARDNUMBERLAST4 | AMOUNT | AUTHID | INTEGRATIONID | RESULT | ERRORMESSAGE |
|---|---|---|---|---|---|
| 1151 | -67.89 | NFWW9I | 1234-5678 | SUCCESS | |
| 1151 | -89.78 | Y3RGBQ | 1478-2589 | INTEGRATIONIDNOTUNIQUE | |
| 1151 | -23.45 | ABC123 | 4567-5623 | TRANSACTIONNOTFOUND | |
| 1151 |  | ABC123 | 9632-8745 | INVALIDDATAFORMAT | INVALID DATA: ERROR PARSING "AMOUNT". INPUT STRING WAS NOT IN A CORRECT FORMAT. |

550 — 592 ACCOUNTID, 594, 596 CARDNUMBERLAST4, 598, 555 COUNT, 560 FILEID, 565, 570, 575, 580, 585, 590

FIG. 6

SYSTEMS AND METHODS FOR OPTIMIZED SETTLEMENT OF SPONSORED ELECTRONIC TRANSACTIONS

CROSS-REFERENCE TO RELATED APPLICATION(S)

This patent application is a divisional of and claims the benefit of priority to U.S. application Ser. No. 16/235,476, filed on Dec. 28, 2018, the entirety of which is incorporated herein by reference.

TECHNICAL FIELD

Various embodiments of the present disclosure relate generally to prepaid payment processing and, more particularly, to prepaid card funding for sponsored purchases.

BACKGROUND

In a typical prepaid card purchase, the consumer must have a balance on the prepaid card equal to or greater than the cost of the item or service to be purchased. The balance on the prepaid card may be provided by the consumer transferring funds from another financial account or may be provided by a merchant, service provider, or other commercial entity as, for example, a promotion, a refund from a prior transaction, or as a form of payment for a transaction, etc. In some cases, the commercial entity may sponsor purchases by providing payment for goods or services used by employees, contractors, or affiliated companies. For example, a transportation company may provide fuel for delivery trucks or long-distance trucks, or a car manufacturer may provide free fuel for a limited time or a limited amount as a promotion to entice consumers to purchase or lease a vehicle. Such an arrangement may be desirable when the vehicle uses a type of fuel, such as hydrogen or compressed natural gas, that may be unfamiliar to consumers and/or which may be less widely available that conventional fuels such as gasoline or diesel. However, funding such purchases by loading an allotted purchase amount onto a prepaid card may lead to misuse of the funds if the employee, contractor, or affiliated company uses the card at a retailer other than the intended retailer, fails to use the card for the intended purchase, or uses the card for an unauthorized purchase. Thus, there is a need for a prepaid card solution that allows for funding of authorized purchases by employees, contractors, or affiliated companies at a specified retailer for a specified purchase and that ensures that the consumer's prepaid card can be used without requiring a particular positive balance at the time of the purchase.

The present disclosure is directed to overcoming one or more of these above-referenced challenges.

SUMMARY OF THE DISCLOSURE

According to certain aspects of the present disclosure, systems and methods are disclosed for prepaid card funding for sponsored purchases.

In one embodiment, a computer-implemented method is disclosed for prepaid card funding for sponsored purchases, the method comprising: receiving a payment request for funding a sponsored purchase using a payment vehicle, deducting funds from a financial account associated with the payment vehicle, such that the financial account has a negative balance, and loading additional funds into the financial account associated with the payment vehicle, such that the financial account has a zero balance.

In accordance with another embodiment, a computer-implemented method is disclosed for prepaid card funding for sponsored purchases, the method comprising: receiving a payment request for funding a sponsored purchase using a payment vehicle, determining whether the payment request is to be included in a grouped transaction request, and upon determining that the payment request is to be included in a grouped transaction request by adding the payment request to a settlement file, transmitting the settlement file to a payment processor, and settling the payment request with a sponsor of the sponsored purchase.

In accordance with another embodiment, a non-transitory machine-readable medium storing instructions that, when executed by the computing system, causes the computing system to perform a method for prepaid card funding for sponsored purchases, the method including: receiving a payment request for funding a sponsored purchase using a payment vehicle, determining whether the payment request is to be included in a grouped transaction request, and upon determining that the payment request is to be included in a grouped transaction request by adding the payment request to a settlement file, transmitting the settlement file to a payment processor, and settling the payment request with a sponsor of the sponsored purchase.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to prepaid card funding for sponsored purchases.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

For simplicity, the description that follows will be provided by reference to a "payment vehicle" or a "prepaid card," which generally refers to any type of alternative to currency. As is to be clear to those skilled in the art, payment vehicles or payment cards can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, prepaid or stored-value cards, electronic benefit transfer cards, electronic currency or electronic wallets (such as might be provided through a cellular telephone or personal digital assistant) or any other like financial transaction instrument.

Figure 2:
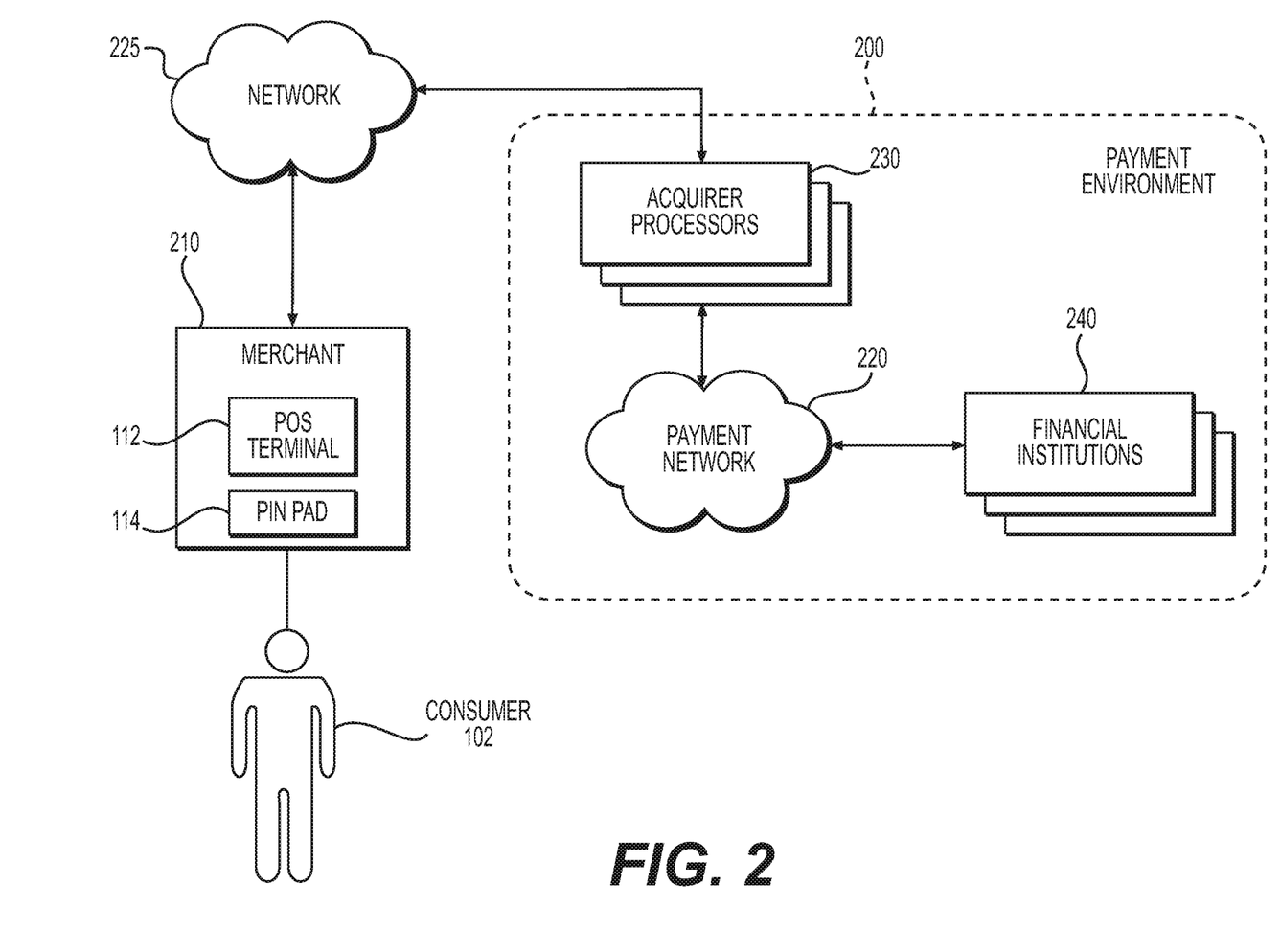
FIG. 2 depicts an exemplary system infrastructure for prepaid card funding for sponsored purchases, according to one or more embodiments.
Figure 6:
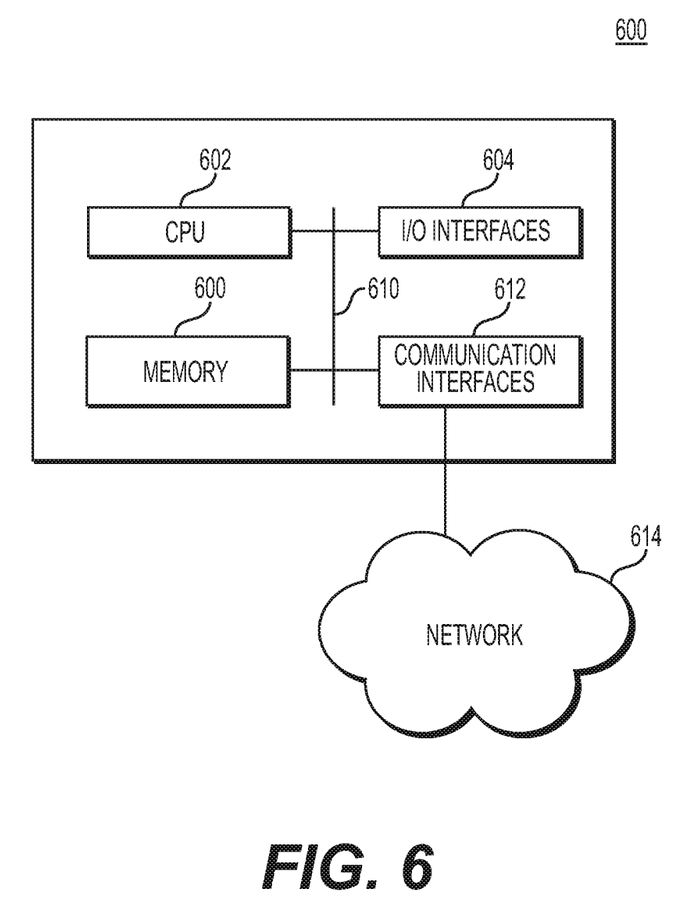
FIG. 6 is a block diagram of an example computing environment, according to one or more embodiments.

Any suitable system infrastructure may be put into place to allow user control of an interactive audiovisual environment, and engagement assessment. FIGS. 2 and 6 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIGS. 2 and 6. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Figure 1:
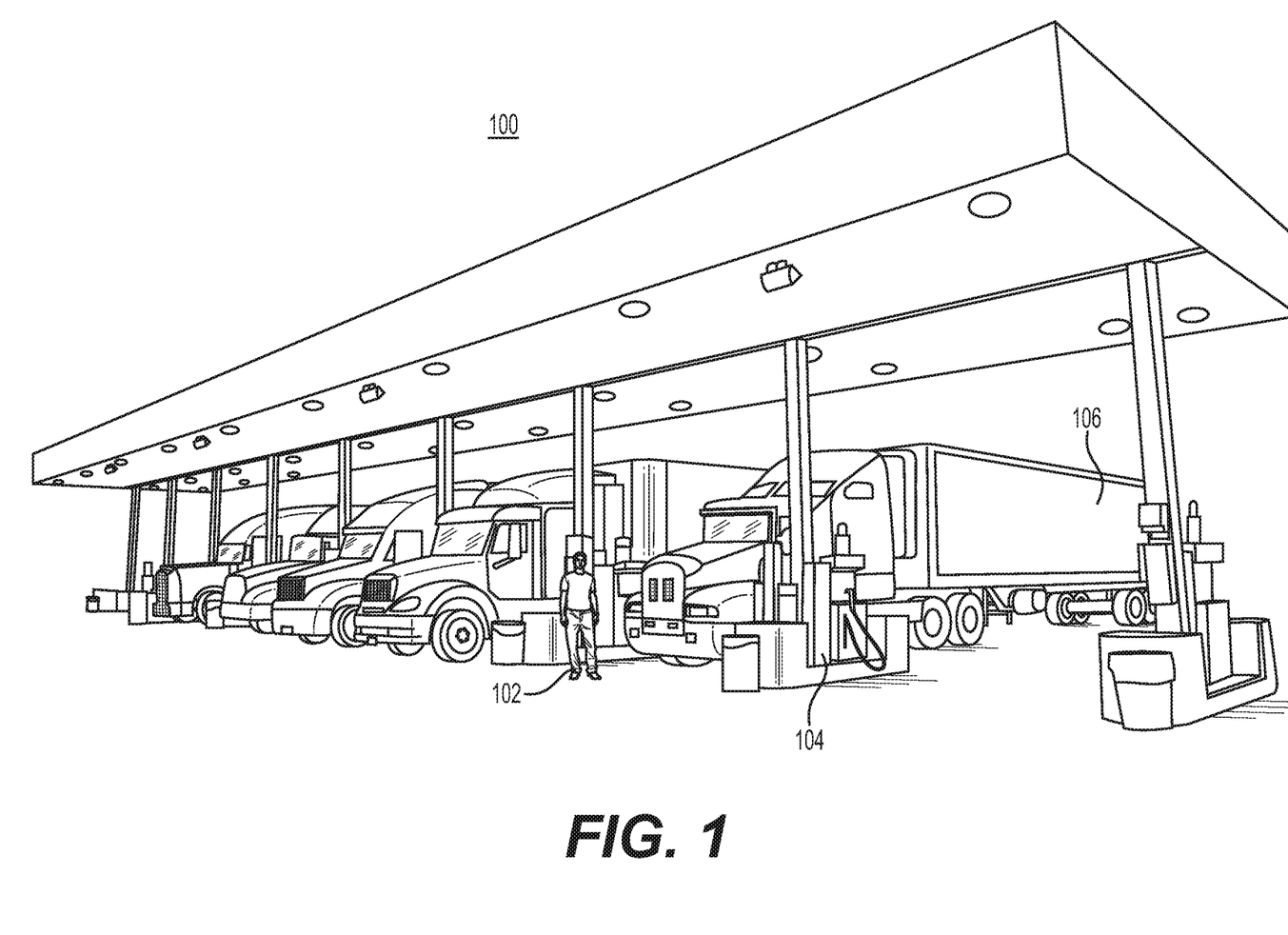
FIG. 1 depicts an exemplary use scenario for prepaid card funding for sponsored purchases, according to one or more embodiments.

FIG. 1 depicts an exemplary use scenario for prepaid card funding for sponsored purchases, according to one or more embodiments. In some scenarios, an organization providing particular products or services to a number of employees, contractors, or related companies may wish to sponsor such purchases by providing funding for the direct purchase of the product or service by an employee or an individual associated with the contractor or related company. Providing such up-front funding may save costs related to processing reimbursement requests and may improve the satisfaction of employees or related individuals. For example, a transportation company employing or contracting with long distance truckers may wish to fund fuel purchases by the truckers. In such a case, an operator 102 of a long distance truck 106 may purchase fuel directly at a fuel station 100, such as by presenting a payment card, such as a prepaid card (not shown) at a POS display of a self-serve fuel pump 104. However, embodiments are not limited to fuel purchases, but may be directed to purchases of any product or service provided to employees, contractors, or related companies.

FIG. 2 depicts an exemplary system infrastructure for prepaid card transaction processing, according to one or more embodiments. As shown in FIG. 2, in a prepaid card transaction processing system, a consumer 102, during the checkout process with a merchant 110, pays for goods or services from merchant 210 through a POS terminal 112, such as, for example, at a PIN pad 114 associated with POS terminal 112. Consumer 102 may use a payment card, such as prepaid card 104 depicted in FIG. 1, as payment and the transaction is processed through a payment environment 100. Because merchant 210 generally can use a different bank or financial institution 240 than consumer 102, an acquirer processor 230 handles the financial transactions that transfer payment between the financial institution 240 of consumer 102 and that of merchant 210. If required, consumer 102 may submit payment information at the PIN pad 114 associated with POS terminal 112 of merchant 110, such as by swiping his or her payment card, inserting his or her chip-based payment card, through wireless near field communication (NFC), etc., or by any other suitable means. Merchant 210 sends a payment request by way of a computer network 225 to an acquirer processor 230. Such a payment request maybe sent by PIN pad 114 or POS terminal 112. Acquirer processor 230 requests, by way of payment network 220, an electronic transfer of funds from the received funds to the financial institution 240 associated with merchant 210.

The payment card presented by consumer 102 may be a credit card in which charges are made against a line of credit instead of the account holder's cash deposits. When consumer 102 uses a credit card to make a purchase, the account linked to the credit card accrues a balance that must be paid off each month. Failure to pay off the credit card on time may result in interest charges and late fees. Alternatively, the payment card may be a debit card, which is used to make purchases with funds in a deposit account associated with the debit card. Debit cards grew out of check cards, a financial instrument meant to replace writing checks for purchases, and may be used in lieu of cash at any retailer that accepts them. Unlike credit cards, which are not tied to cash deposits, a debit card can only be used if the associated deposit account contains sufficient funds. Finally, the payment card may be a prepaid card resembling a standard credit card, but which works like a debit card. Funds must be front-loaded on the prepaid card first before the prepaid card can be used for purchases. The balance on the prepaid card may be provided by the consumer transferring funds from another financial account or may be provided by a merchant or other commercial entity as, for example, a promotion, a refund from a prior transaction, or as a form of payment for a transaction, etc.

Merchant 210, acquirer processor 230, and/or a service provider (not shown) may provide an infrastructure for prepaid card funding for a single transaction. FIGS. 2 and 6 depict an exemplary system infrastructure for prepaid card funding for a single transaction, according to one or more embodiments.

Figure 3:
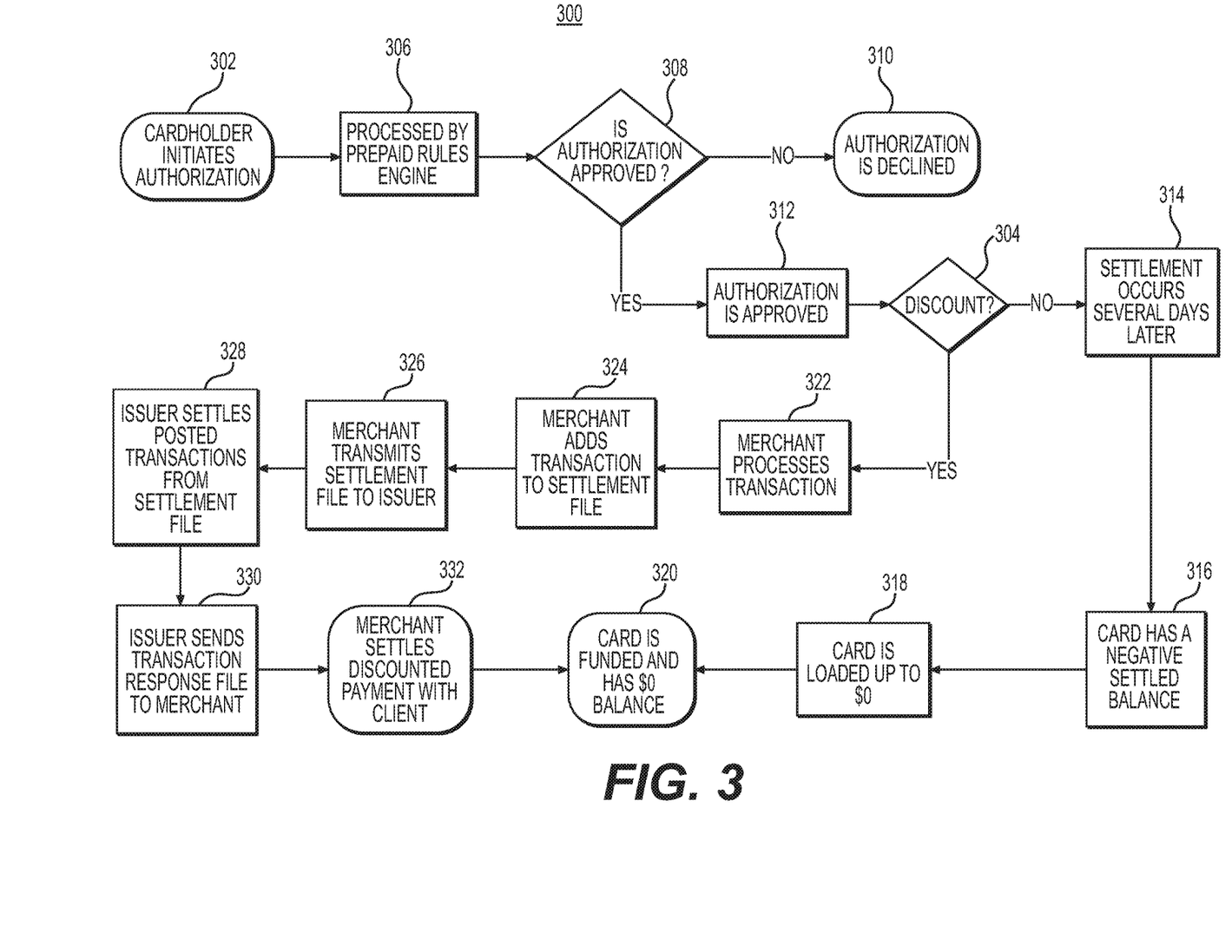
FIG. 3 depicts a flowchart of a method of prepaid card funding for sponsored purchases, according to one or more embodiments.

FIG. 3 depicts a flowchart of a method of prepaid card funding for sponsored purchases, according to one or more embodiments. As shown in FIG. 3, in operation 302, cardholder 102 may initiate an authorization request for a sponsored purchase of a provided product or service such as, for example, by presenting a payment vehicle at a point of sale (POS) terminal 112 of merchant 210. The payment vehicle may be a prepaid card. Upon initiation of the authorization request, merchant 210 may transmit the authorization request to a acquirer processor 230 for further processing, and, in operation 306, the authorization request may be processed by a rules engine of acquirer processor to determine whether the purchase is authorized. In particular, an organization sponsoring the purchase with the prepaid card may wish to limit the use of funds loaded onto the prepaid card. For example, the organization sponsoring the purchase may wish to limit the use to a certain type of merchant or service provider, such as, for example, by merchant category code (MCC), at a particular merchant such as, for example, by a merchant identifier (MID), at limited location, such as, for example, within a geofence radiating a predetermined radius from a desired location, at locations along a particular route from a starting point and a destination, at a limited time, such as within a predetermined window of time, or for a particular product or service. For example, the organization sponsoring the purchase may wish to limit the use of available funds to the purchase of fuel at a fueling station or chain of fueling stations. Attempts to use the funds for any other purpose may result in the disapproval of the requested transaction.

In operation 308, acquirer processor 230 may determine whether the authorization request is approved. In ordinary transactions using a prepaid card, purchases are limited to funds currently available on the card. However, the organization sponsoring the purchase may have prearranged with acquirer processor 230 to allow approval of authorization requests regardless of funds available. This arrangement may be embodied by rules applied by the rules engine effectively forcing an approval of an authorization request presented for a known prepaid card and meeting predetermined criteria.

If acquirer processor 230 determines that the authorization request is not approved, then in operation 310, the authorization request may be declined and further processing of the authorization request may be terminated.

If acquirer processor 230 determines that the authorization request is approved, then in operation 312, authorization request approval and processing may proceed such as, for example, by way of payment network 220 and financial institutions 240. The authorization request may be included in a bulk or grouped transaction request. For example, the authorization request may indicate that a discount is to be applied, such as a fleet discount, or a discount based on a type of product or service purchased. For example, a purchase of a particular type of fuel, such as, for example, hydrogen or compressed natural gas, may receive a discounted price. If the authorization request is not to be included in a bulk or grouped transaction request, such as a discounted purchase, then in operation 314, the authorization request may be settled. Settlement of the authorization request may occur several days after the authorization request. In operation 316, the prepaid card presented for the authorization request may have a negative settled balance. In operation 318, acquirer processor 230 may authorize loading of funds onto the prepaid card such that the prepaid card has a balance of $0, and in operation 320, the prepaid card is fully funded and has a balance of $0.

If the authorization request is to be included in a bulk or grouped transaction request, such as a discounted purchase, then in operation 322, merchant 210 may process the authorization request directly without forwarding the request to acquirer processor 230. In operation 324, merchant 210 may add a record of the authorized transaction to a settlement file. The structure and contents of the settlement file will be discussed in greater detail below. In operation 326, merchant 210 may periodically transmit the settlement file to an issuer of the prepaid card. This transmission may be completed, for example, daily, weekly, monthly, or more or less frequently, depending, for example, on the agreement between merchant 210 and the issuer, the volume of settled transactions, and other factors.

In operation 328, the issuer of the prepaid card may settle posted transactions from the settlement file. The settlement of each transaction may result in a variety of result conditions based on the particulars of the transaction and the data presented in the settlement file. In operation 330, the issuer may send a transaction response file to merchant 210. The transaction response file may contain a result record corresponding to each transaction in the settlement file. The structure and contents of the response file will be discussed in greater detail below. In operation 332, merchant 210 may settle a discounted payment with the organization providing the purchased products or services to cardholder 102.

Figure 4:
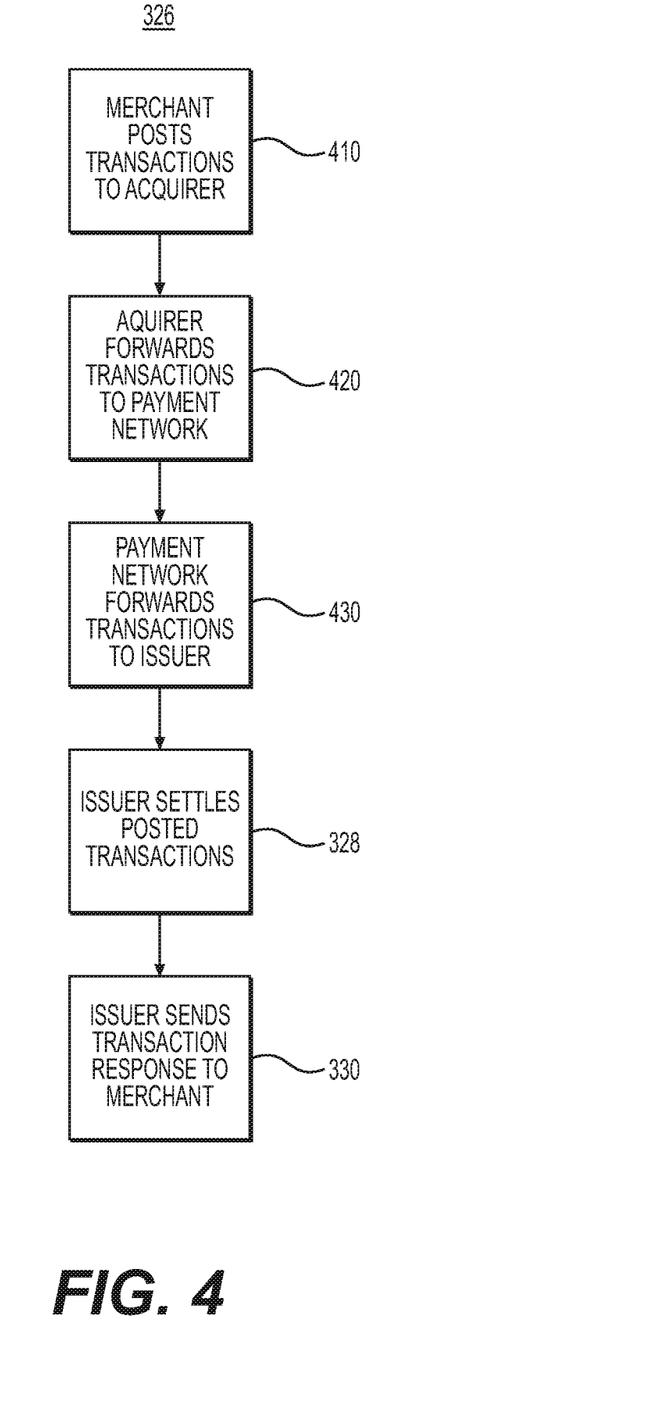
FIG. 4 depicts a flowchart of a method of batch processing in prepaid card funding for sponsored purchases, according to one or more embodiments.

FIG. 4 depicts a flowchart of a method of batch processing in prepaid card funding for sponsored purchases, according to one or more embodiments. As discussed above with respect to FIG. 3, in operation 326, merchant 210 may periodically transmit the settlement file to an issuer of the prepaid card. However, in an alternative embodiment, merchant 210 may interact with an acquirer processor 230 to process the transactions represented in the settlement file.

Accordingly, as shown in FIG. 4, in operation 410, merchant 210 may periodically transmit the settlement file to acquirer processor 230 for processing and settlement. In operation 420, acquirer processor 230 may forward the transactions to payment network 420, which then forwards the transactions to an appropriate issuer in operation 430. In this operation all transactions may be forwarded to the same issuer, or the transactions may be transmitted to different issuers, depending on the details of the transactions and the payment vehicles used for each transaction. In operation 328, as in the method shown in FIG. 3, the issuer of the prepaid card associated with each record of the settlement file may settle posted transactions from the settlement file. The settlement of each transaction may result in a variety of result conditions based on the particulars of the transaction and the data presented in the settlement file. In operation 330, each issuer may send a transaction response file to merchant 210. The transaction response file may contain a result record corresponding to each transaction in the settlement file. The structure and contents of the response file will be discussed in greater detail below. If merchant 210 receives multiple transaction response files from multiple issuers, then merchant 210 may combine the response files into a single response file for further processing, or merchant 210 may process each response file separately. The method may continue with operation 332, as shown in FIG. 3, in which merchant 210 may settle a discounted payment with the organization providing the purchased products or services to cardholder 102.

Figure 5A:
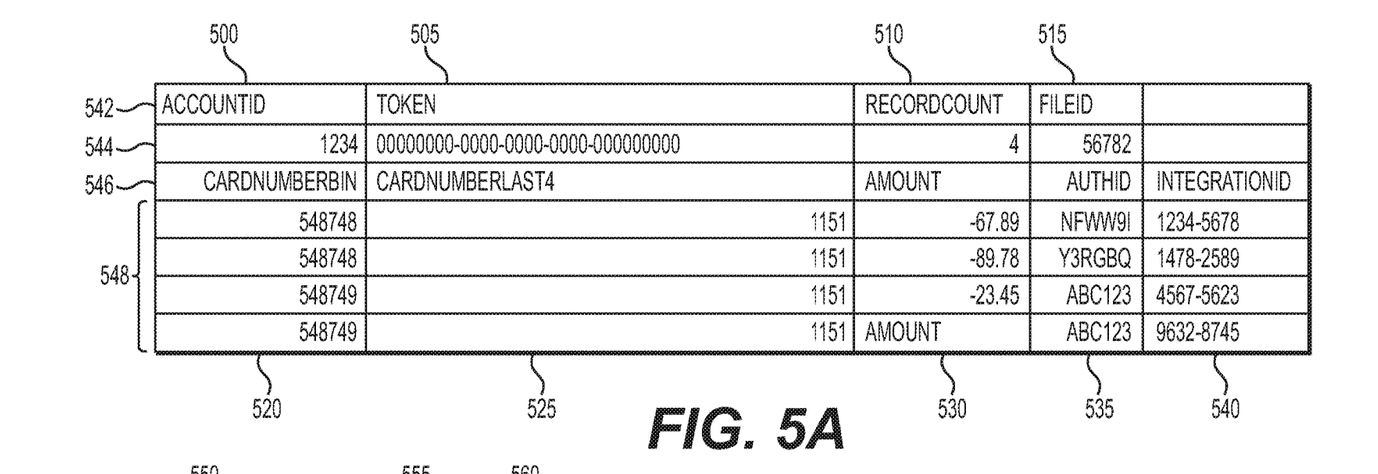
FIG. 5A depicts an exemplary batch settlement file for prepaid card funding for sponsored purchases, according to one or more embodiments.

FIG. 5A depicts an exemplary batch settlement file for prepaid card funding for sponsored purchases, according to one or more embodiments. As shown in FIG. 5A, an exemplary batch settlement file for prepaid card funding for sponsored purchases, according to one or more embodiments may include a header row 544 and one or more detail rows 548. Header row 544 may be proceeded by header declaration row 542, and detail rows 548 may be preceded by detail row declaration row 546. Header declaration row 542 and detail row declaration row 546 may provide labels that give the batch settlement file a more human readable format such that manual users can quickly identify the following row's columns. Header row 544 may include an account identifier 500, which may specify a client identifier assigned by the issuer of the prepaid card or by acquirer processor 230, a token globally unique identifier (GUID) 505, which may be a security key provided the issuer of the prepaid card or by acquirer processor 230, a record count 510, which may specify the number of detail records in the file, and a file identifier 515, which may be a an identifier for the settlement file assigned by merchant 210. Detail rows 548 may include a card number bank identifier number (BIN) 520, which may be an identifier for a financial institution contained in the first 6 digits of the primary account number of the prepaid card, the last four digits of the PAN 525, an amount 530 of the transaction, which may be a negative to notify the issuer or acquirer processor 230 to decrement the available funds associated with the prepaid card, an authorization identifier (ID) 535, which may be an authorization identifier generated by the issuer or acquirer processor 230, and an integration identifier (ID) 540.

Figure 5B:
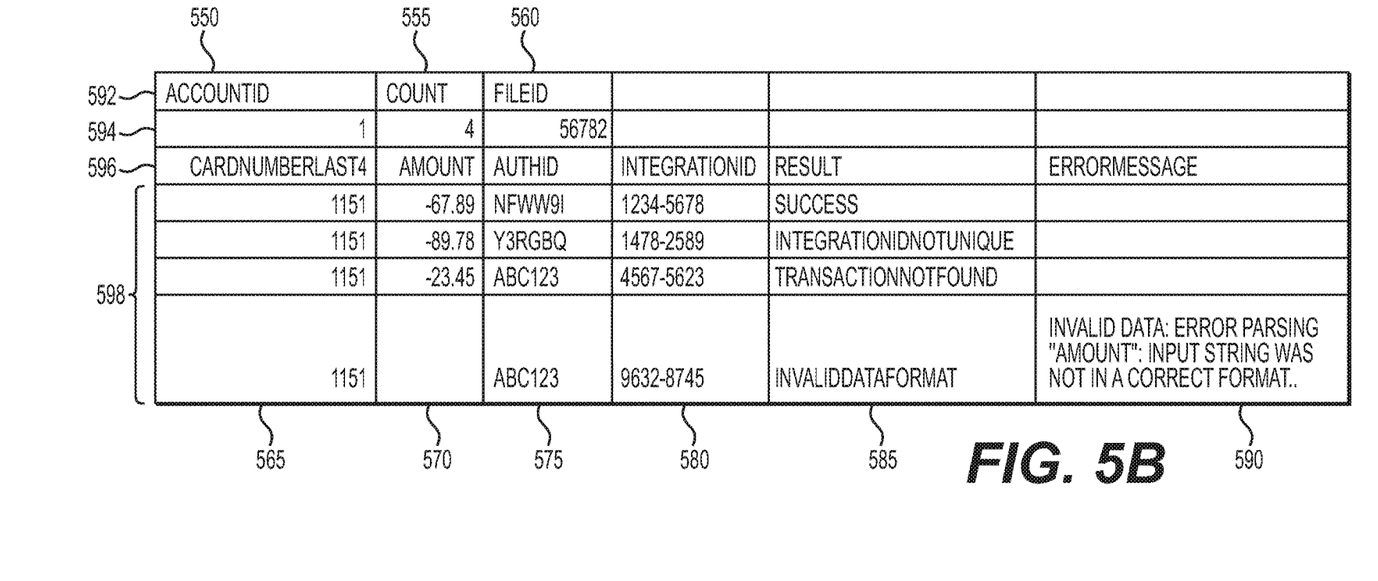
FIG. 5B depicts an exemplary batch response file for prepaid card funding for sponsored purchases, according to one or more embodiments.

FIG. 5B depicts an exemplary batch response file for prepaid card funding for sponsored purchases, according to one or more embodiments. As shown in FIG. 5B, an exemplary batch response file for prepaid card funding for sponsored purchases, according to one or more embodiments may include a header row 594 and one or more detail rows 598. Header row 594 may be proceeded by header declaration row 592, and detail rows 598 may be preceded by detail row declaration row 596. Header declaration row 592 and detail row declaration row 596 may provide labels that give the batch settlement file a more human readable format such that manual users can quickly identify the following row's columns. Header row 594 may include an account identifier 550, which may specify a client identifier assigned by the issuer of the prepaid card or by acquirer processor 230, a record count 555, which may specify the number of detail records in the file, and a file identifier 560, which may be a an identifier for the settlement file assigned by merchant 210. Detail rows 598 may include the last four digits of the prepaid card primary account number (PAN) 565, an amount 570 of the transaction from the corresponding detail row 548 of the batch settlement file, an authorization identifier (ID) 575 from the corresponding detail row 548 of the batch settlement file, an integration identifier (ID) 580 from the corresponding detail row 548 of the batch settlement file, a processing result 585 for the transaction specified by the corresponding detail row 548 of the batch settlement file, and an error message 590, which may describe any error that occurred during processing. Result 585 may be, for example, one of success, error, invalid format, invalid integration ID, and transaction not found. Error message 590 may be a text message describing any error that occurred.

The systems and processes described above may be performed on or between one or more computing devices. FIG. 6 illustrates an example computing device. A computing device 600 may be a server, a computing device that is integrated with other systems or subsystems, a mobile computing device such as a smart phone, a cloud-based computing ability, and so forth. The computing device 600 may be any suitable computing device as would be understood in the art, including without limitation, a custom chip, and embedded processing device, a tablet computing device, a POS terminal associated with the merchant 110, a back-office system of a merchant 110, a personal data assistant (PDA), a desktop, laptop, microcomputer, and minicomputer, a server, a mainframe, or any other suitable programmable device. In various embodiments disclosed herein, a single component may be replaced by multiple components and multiple components may be replaced by single component to perform a given function or functions. Except where such substitution would not be operative, such substitution is within the intended scope of the embodiments.

The computing device 600 includes a processor 602 that may be any suitable type of processing unit, for example a general-purpose central processing unit (CPU), a reduced instruction set computer (RISC), a processor that has a pipeline or multiple processing capability including having multiple cores, a complex instruction set computer (CISC), a digital signal processor (DSP), application specific integrated circuits (ASIC), a programmable logic devices (PLD), and a field programmable gate array (FPGA), among others. The computing resources may also include distributed computing devices, cloud computing resources, and virtual computing resources in general.

The computing device 600 also includes one or more memories 606, for example read-only memory (ROM), random access memory (RAM), cache memory associated with the processor 602, or other memory such as dynamic RAM (DRAM), static RAM (SRAM), programmable ROM (PROM), electrically erasable PROM (EEPROM), flash memory, a removable memory card or disc, a solid-state drive, and so forth. The computing device 600 also includes storage media such as a storage device that may be configured to have multiple modules, such as magnetic disk drives, floppy drives, tape drives, hard drives, optical drives and media, magneto-optical drives and media, compact disk drives, Compact Disc Read Only Memory (CD-ROM), compact disc recordable (CD-R), Compact Disk Rewritable (CD-RW), a suitable type of Digital Versatile Disc (DVD) or BluRay disc, and so forth. Storage media such as flash drives, solid-state hard drives, redundant array of individual discs (RAID), virtual drives, networked drives and other memory means including storage media on the processor 602, or memories 606 are also contemplated as storage devices. It may be appreciated that such memory may be internal or external with respect to operation of the disclosed embodiments. It may be appreciated that certain portions of the processes described herein may be performed using instructions stored on a computer readable medium or media that direct computer system to perform the process steps. Non-transitory computable-readable media, as used herein, comprises all computer-readable media except for transitory, propagating signals.

Networking communication interfaces 612 may be configured to transmit to, or receive data from, other computing devices 600 across a network 614. The network and communication interfaces 612 may be an Ethernet interface, a radio interface, a Universal Serial Bus (USB) interface, or any other suitable communications interface and may include receivers, transmitter, and transceivers. For purposes of clarity, a transceiver may be referred to as a receiver or a transmitter when referring to only the input or only the output functionality of the transceiver. Example communication interfaces 612 may include wire data transmission links such as Ethernet and TCP/IP. The communication interfaces 612 may include wireless protocols for interfacing with private or public networks 614. For example, the network and communication interfaces 612 and protocols may include interfaces for communicating with private wireless networks such as Wi-Fi network, one of the IEEE 802.11x family of networks, or another suitable wireless network. The network and communication interfaces 612 may include interfaces and protocols for communicating with public wireless networks 612, using for example wireless protocols used by cellular network providers, including Code Division Multiple Access (CDMA) and Global System for Mobile Communications (GSM). A computing device 600 may use network and communication interfaces 612 to communicate with hardware modules such as a database or data store, or one or more servers or other networked computing resources. Data may be encrypted or protected from unauthorized access.

In various configurations, the computing device 600 may include a system bus 616 for interconnecting the various components of the computing device 600, or the computing device 600 may be integrated into one or more chips such as programmable logic device or application specific integrated circuit (ASIC). The system bus 616 may include a memory controller, a local bus, or a peripheral bus for supporting input and output devices 604, and communication interfaces 612. Example input and output devices 604 include keyboards, keypads, gesture or graphical input devices, motion input devices, touchscreen interfaces, one or more displays, audio units, voice recognition units, vibratory devices, computer mice, and any other suitable user interface.

The processor 602 and memory 606 may include nonvolatile memory for storing computable-readable instructions, data, data structures, program modules, code, microcode, and other software components for storing the computer-readable instructions in non-transitory computable-readable mediums in connection with the other hardware components for carrying out the methodologies described herein. Software components may include source code, compiled code, interpreted code, executable code, static code, dynamic code, encrypted code, or any other suitable type of code or computer instructions implemented using any suitable high-level, low-level, object-oriented, visual, compiled, or interpreted programming language.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for prepaid card funding for sponsored purchases, the method comprising:
   receiving, at a point of sale terminal of a merchant, a payment request by a consumer for funding a sponsored purchase using a payment vehicle;
   forcing an approval of the payment request regardless of funds available on the payment vehicle based on the payment vehicle being a known payment vehicle and meeting predetermined criteria including one or more of the sponsored purchase being at a certain type of merchant identified by a merchant category code (MCC), at a particular merchant identified by a merchant identifier (MID), within a geofence radiating a predetermined radius from a desired location, at a location along a particular route from a starting point and a destination, within a predetermined window of time, or for a particular product or service;
   determining, at a merchant device in communication with the point of sale terminal, whether the payment request is to be included in a grouped transaction request; and
   upon determining, at the merchant device in communication with the point of sale terminal, that the payment request is to be included in a grouped transaction request:
   determining, by the merchant device in communication with the point of sale terminal, whether the payment request is subject to a discount based on whether the payment request is for a particular type of fuel, wherein the particular type of fuel is hydrogen or compressed natural gas;
   upon determining that the payment request is subject to a discount, adding the payment request to a discounted settlement file of payment requests subject to a discount stored by the merchant device in communication with the point of sale terminal;
   upon determining that the payment request is not subject to a discount, adding the payment request to an undiscounted settlement file of payment requests not subject to a discount stored by the merchant device in communication with the point of sale terminal;
   transmitting the discounted settlement file of payment requests subject to a discount from the merchant device in communication with the point of sale terminal directly to an issuer of the payment vehicle within a same business day without forwarding the discounted settlement file to an acquirer processor;
   transmitting the undiscounted settlement file of payment requests not subject to a discount from the merchant device in communication with the point of sale terminal to the issuer of the payment vehicle at least two days after receiving the payment request;
   receiving a transaction response file from the issuer; and settling, by the merchant device in communication with the point of sale terminal, the payment request with a sponsor of the sponsored purchase, based on the transaction response file.

2. The computer-implemented method of claim 1, wherein the sponsor of the sponsored purchase is a transportation company and the sponsored purchase is for fuel.

3. The computer-implemented method of claim 1, wherein the sponsor of the sponsored purchase is a motor vehicle manufacturing company and the sponsored purchase is for fuel.

4. The computer-implemented method of claim 3, wherein the fuel is the hydrogen or the compressed natural gas.

5. A non-transitory machine-readable medium storing instructions that, when executed by a computing system, causes the computing system to perform a method for method for prepaid card funding for sponsored purchases, the method including:
 receiving, at a point of sale terminal of a merchant, a payment request by a consumer for funding a sponsored purchase using a payment vehicle;
 forcing an approval of the payment request regardless of funds available on the payment vehicle based on the payment vehicle being a known payment vehicle and meeting predetermined criteria including one or more of the sponsored purchase being at a certain type of merchant identified by a merchant category code (MCC), at a particular merchant identified by a merchant identifier (MID), within a geofence radiating a predetermined radius from a desired location, at a location along a particular route from a starting point and a destination, within a predetermined window of time, or for a particular product or service;
 determining, at a merchant device in communication with the point of sale terminal, whether the payment request is to be included in a grouped transaction request; and
 upon determining, at the merchant device in communication with the point of sale terminal, that the payment request is to be included in a grouped transaction request:
 determining, by the merchant, whether the payment request is subject to a discount based on whether the payment request is for a particular type of fuel, wherein the particular type of fuel is hydrogen or compressed natural gas;
 upon determining that the payment request is subject to a discount, adding the payment request to a discounted settlement file of payment requests subject to a discount stored by the merchant device in communication with the point of sale terminal;
 upon determining that the payment request is not subject to a discount, adding the payment request to an undiscounted settlement file of payment requests not subject to a discount stored by the merchant device in communication with the point of sale terminal;
 transmitting the discounted settlement file of payment requests subject to a discount from the merchant device in communication with the point of sale terminal directly to an issuer of the payment vehicle within a same business day without forwarding the discounted settlement file to an acquirer processor;
 transmitting the undiscounted settlement file of payment requests not subject to a discount from the merchant device in communication with the point of sale terminal to the issuer of the payment vehicle at least two days after receiving the payment request;
 receiving, from the issuer, a transaction response file; and
 settling, by the merchant device in communication with the point of sale terminal, the payment request with a sponsor of the sponsored purchase, based on the transaction response file.

6. The non-transitory machine-readable medium of claim 5, wherein the sponsor of the sponsored purchase is a transportation company and the sponsored purchase is for fuel.

7. The non-transitory machine-readable medium of claim 5, wherein the sponsor of the sponsored purchase is a motor vehicle manufacturing company and the sponsored purchase is for fuel.

8. The non-transitory machine-readable medium of claim 7, wherein the fuel is the hydrogen or the compressed natural gas.

9. A system for prepaid card funding for sponsored purchases, the system comprising:
 a data storage device storing instructions for prepaid card funding for sponsored purchases in an electronic storage medium; and
 a processor configured to execute the instructions to perform a method including:
 receiving, at a point of sale terminal of a merchant, a payment request by a consumer for funding a sponsored purchase using a payment vehicle;
 forcing an approval of the payment request regardless of funds available on the payment vehicle based on the payment vehicle being a known payment vehicle and meeting predetermined criteria including one or more of the sponsored purchase being at a certain type of merchant identified by a merchant category code (MCC), at a particular merchant identified by a merchant identifier (MID), within a geofence radiating a predetermined radius from a desired location, at a location along a particular route from a starting point and a destination, within a predetermined window of time, or for a particular product or service;
 determining, at a merchant device in communication with the point of sale terminal, whether the payment request is to be included in a grouped transaction request; and
 upon determining, at the merchant device in communication with the point of sale terminal, that the payment request is to be included in a grouped transaction request:
 determining, by the merchant device in communication with the point of sale terminal, whether the payment request is subject to a discount based on whether the payment request is for a particular type of fuel, wherein the particular type of fuel is hydrogen or compressed natural gas;
 upon determining that the payment request is subject to a discount, adding the payment request to a discounted settlement file of payment requests subject to a discount stored by the merchant device in communication with the point of sale terminal;
 upon determining that the payment request is not subject to a discount, adding the payment request to an undiscounted settlement file of payment requests not subject to a discount stored by the merchant device in communication with the point of sale terminal;
 transmitting the discounted settlement file of payment requests subject to a discount from the merchant device in communication with the point of sale terminal directly to an issuer of the payment vehicle within a same business day without forwarding the discounted settlement file to an acquirer processor;

transmitting the undiscounted settlement file of payment requests not subject to a discount from the merchant device in communication with the point of sale terminal to the issuer of the payment vehicle at least two days after receiving the payment request;

receiving, from the issuer, a transaction response file; and settling, by the merchant device in communication with the point of sale terminal, the payment request with a sponsor of the sponsored purchase, based on the transaction response file.

\* \* \* \* \*

UNITED STATES PATENT AND TRADEMARK OFFICE
CERTIFICATE OF CORRECTION

| | | |
|---|---|---|
| PATENT NO. | : 11,854,000 B1 | Page 1 of 1 |
| APPLICATION NO. | : 16/826590 | |
| DATED | : December 26, 2023 | |
| INVENTOR(S) | : Jackson Andrew Unrau | |

It is certified that error appears in the above-identified patent and that said Letters Patent is hereby corrected as shown below:

In the Claims

In Column 11, Line 17, after "perform a" delete "method for"

Signed and Sealed this
Thirtieth Day of January, 2024

Katherine Kelly Vidal
*Director of the United States Patent and Trademark Office*